US008553407B2

United States Patent
Zhou

(10) Patent No.: US 8,553,407 B2
(45) Date of Patent: Oct. 8, 2013

(54) DOCKING STATION FOR ELECTRONIC DEVICE

(75) Inventor: Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 62 days.

(21) Appl. No.: 13/282,051

(22) Filed: Oct. 26, 2011

(65) Prior Publication Data

US 2013/0003291 A1   Jan. 3, 2013

(30) Foreign Application Priority Data

Jun. 28, 2011   (CN) .......................... 2011 1 0176622

(51) Int. Cl.
H05K 5/00 (2006.01)
H05K 7/00 (2006.01)
G06F 1/16 (2006.01)

(52) U.S. Cl.
USPC ................................ 361/679.41; 361/679.56

(58) Field of Classification Search
USPC ......................................... 361/679.4–679.45
See application file for complete search history.

(56) References Cited

U.S. PATENT DOCUMENTS

| | | | |
|---|---|---|---|
| 6,407,914 B1 * | 6/2002 | Helot | 361/679.41 |
| 6,583,985 B2 * | 6/2003 | Nguyen et al. | 361/679.27 |
| 6,683,786 B2 * | 1/2004 | Yin et al. | 361/679.4 |
| 6,844,494 B1 * | 1/2005 | Nevins | 174/53 |
| 7,189,106 B2 * | 3/2007 | Young | 439/501 |
| 7,447,013 B2 * | 11/2008 | Shi et al. | 361/679.33 |
| 7,502,225 B2 * | 3/2009 | Solomon et al. | 361/679.41 |
| 7,876,066 B2 * | 1/2011 | Mori et al. | 320/107 |
| 7,899,970 B2 * | 3/2011 | Mori | 710/313 |
| 7,959,459 B2 * | 6/2011 | Mundt | 439/501 |
| 8,174,825 B2 * | 5/2012 | Lee et al. | 361/679.37 |
| 8,201,687 B2 * | 6/2012 | Zeliff et al. | 206/320 |
| 2004/0129522 A1 * | 7/2004 | Skowronski | 191/12.2 R |
| 2005/0140640 A1 | 6/2005 | Oh et al. | |
| 2005/0162824 A1 * | 7/2005 | Thompson | 361/686 |
| 2006/0061958 A1 * | 3/2006 | Solomon et al. | 361/686 |
| 2007/0258204 A1 * | 11/2007 | Chang et al. | 361/683 |
| 2008/0252794 A1 | 10/2008 | Su et al. | |
| 2010/0062615 A1 * | 3/2010 | Prest | 439/38 |
| 2010/0073862 A1 * | 3/2010 | Carnevali | 361/679.43 |
| 2010/0118485 A1 * | 5/2010 | Crooijmans et al. | 361/679.43 |
| 2010/0134072 A1 * | 6/2010 | Neu et al. | 320/137 |
| 2010/0162325 A1 * | 6/2010 | Bonar | 725/76 |
| 2010/0171465 A1 * | 7/2010 | Seal et al. | 320/114 |
| 2012/0033375 A1 * | 2/2012 | Madonna et al. | 361/679.43 |

(Continued)

FOREIGN PATENT DOCUMENTS

| CN | 1873772 | 12/2006 |
|---|---|---|
| TW | 200841748 | 10/2008 |

*Primary Examiner* — Adrian S Wilson
(74) *Attorney, Agent, or Firm* — Altis Law Group, Inc.

(57) ABSTRACT

A docking station is used for receiving an electronic device. The docking station includes a housing, a docking port, and a locking mechanism. The housing defines a receiving slot. The docking port is arranged inside the housing and is capable of partly extending into the receiving slot to engage with the electronic device when the electronic device is received in the receiving slot. The locking mechanism is connected to the docking port for locking the docking port in the receiving slot. The locking mechanism is partly exposed outside the housing to allow to be operated to drive the docking port to be retracted from the receiving slot.

20 Claims, 5 Drawing Sheets

(56) References Cited

U.S. PATENT DOCUMENTS

2012/0182675 A1* 7/2012 Zhou .................. 361/679.01
2012/0189156 A1* 7/2012 Leung ..................... 381/387
2012/0220162 A1* 8/2012 Zhou et al. ................ 439/501
2012/0229967 A1* 9/2012 Zhou .................. 361/679.01
2012/0275092 A1* 11/2012 Zhou .................. 361/679.01
2012/0293949 A1* 11/2012 Zhou .................. 361/679.41

* cited by examiner

DOCKING STATION FOR ELECTRONIC DEVICE

BACKGROUND

1. Technical Field

The present disclosure relates to docking stations, and in particular, to a docking station for an electronic device.

2. Description of Related Art

Many hand held electronic devices, such as mobile phones and music players, for example, can be held in docking stations. A docking station will include a port that can allow the electronic device to communicate with other devices. The docking station defines a slot for supporting the electronic device. However, the port is typically arranged in a fixed configuration, which is inconvenient should users only want to use the docking station as just a stand without engaging the port. Furthermore, when not in use the port is exposed and may be contaminated, and this may degrade or shorten the life of the port and the docking station.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
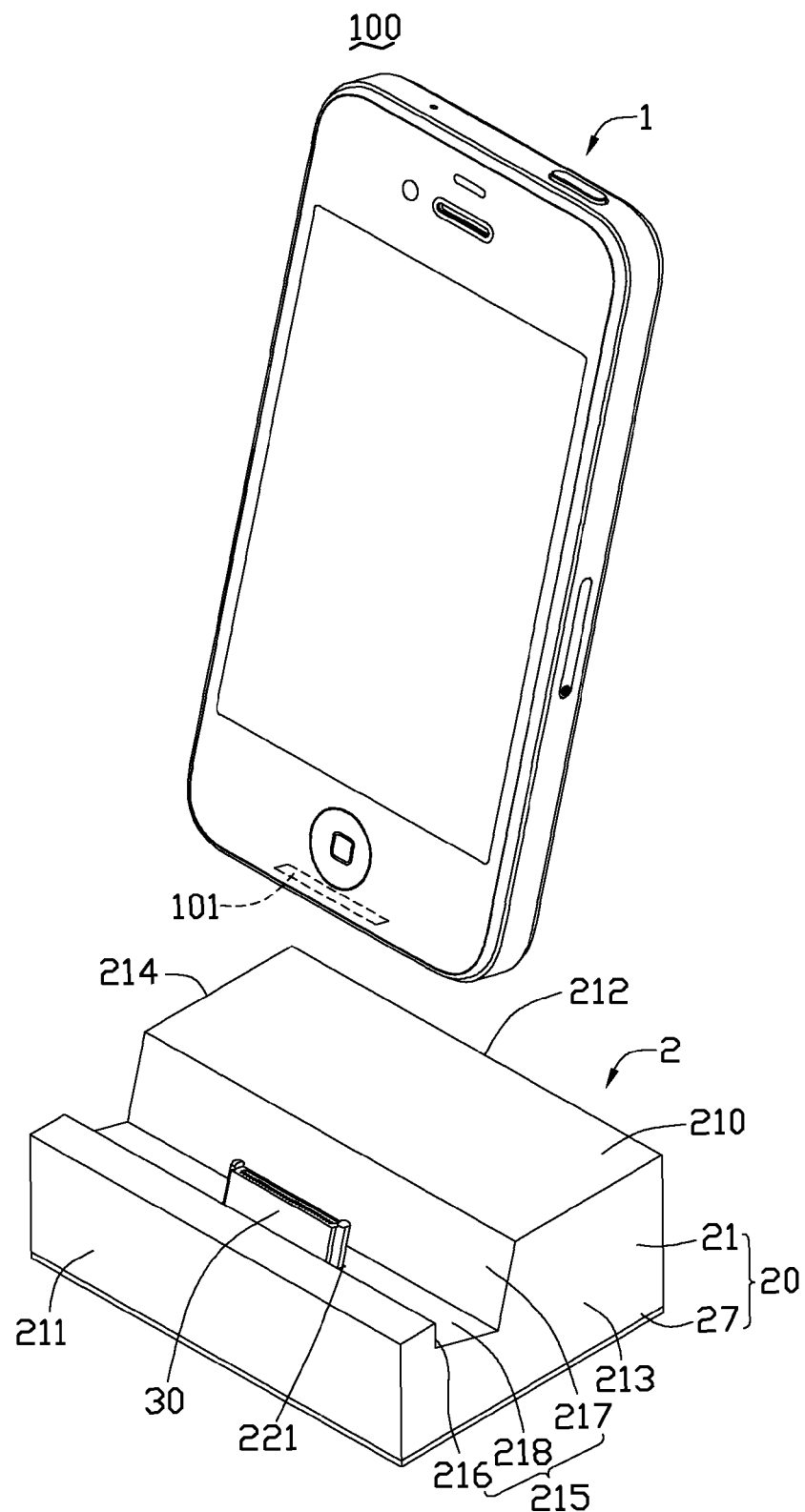
FIG. 1 is a schematic view of a docking station with an electronic device engaged therein according to an embodiment of the present disclosure.

Referring to FIG. 1, an electronic apparatus 100 including an electronic device 1 and a docking station 2 for docking and/or supporting of the electronic device 1 is shown. The electronic device 1 may be any hand-held electronic device such as a mobile phone, a tablet computer, for example. The electronic device 1 defines a port 101 in an end portion. The docking station 2 can be used as a stand for supporting the electronic device 1 in a convenient position and can act as a docking station providing convenient interface between the electronic device 1 and peripheral devices, such as a computer or a power supply or a charger.

The docking station 2 includes a housing 20 for receiving various components of the docking station 2. The housing 20 includes an upper housing 21 and a lower housing 27 attached to the upper housing 21. The upper housing 21 includes a top wall 210 and four side walls 211, 212, 213, 214 protruding downwards from the top wall 210. The top wall 210 is recessed to define a receiving slot 215 partially surrounded by a front wall 216, a rear wall 217, and a bottom wall 218. The rear wall 217 slants upwards from the top wall 210 and forms an acute angle with the top wall 210. The bottom wall 218 is substantially perpendicular to the rear wall 217 and cooperates with the rear wall 217 to support the electronic device 1 in an inclined position when the electronic device 1 is received in the receiving slot 215.

Figure 3:
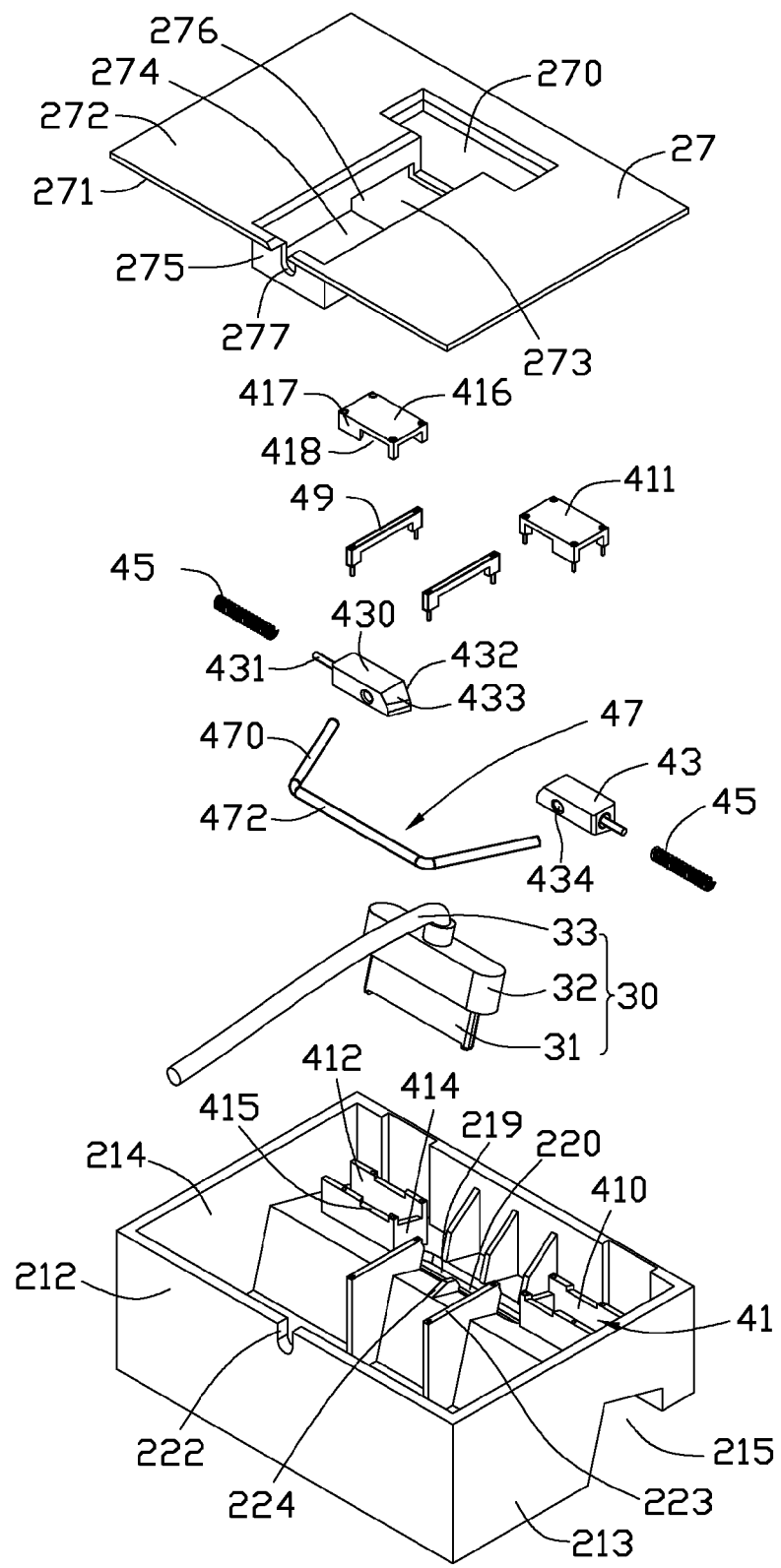
FIG. 3 is a dissembled view of the docking station of FIG. 2.

Referring to FIG. 3, the internal surface of the bottom wall 218 is recessed to define a first opening 219 partially surrounded by an abutting wall 220 which is substantially parallel to the internal surface of the bottom wall 218. A first through hole 221 (see FIG. 1) is defined in the abutting wall 220. One end of the side wall 212, which is away from the top wall 210 defines a second opening 222 in the middle portion. Two paralleled holding portions 223 substantially corresponding to the first opening 219 protrude from the internal surface of the top wall 210 and extend to be connected to the internal surface of the bottom wall 218. An abutting portion 224 protrudes from the internal surface of the bottom wall 218 and is substantially located between the two holding portions 223.

The lower housing 27 defines a second through hole 270 corresponding to the first through hole 221. The lower housing 27 further includes a first surface 271 facing the internal surface of the top wall 210 and a second surface 272 opposite to the first surface 271. The second surface 272 is recessed to define a holding slot 273. The holding slot 273 is partially surrounded by a bottom portion 274 substantially parallel to the second surface 272 and a side portion 275 substantially perpendicular to the second surface 272. A third through hole 276 is defined in the bottom portion 274 and adjacent the second through hole 270 to partly expose the components received inside the housing 20. A third opening 277 is defined in the side portion 275, which can be aligned with second opening 222 when the lower housing 27 is attached to the upper housing 21.

A detachable docking port 30 is disposed inside the housing 20 to be engageable with the electronic device 1 when the electronic device 1 is received in the docking station 1. The docking port 30 includes a connector 31, a base 32 (see FIG. 2) for holding the connector 31, and a cable 33 for electrically connecting the docking port 30 to an external power source or other peripheral devices. The connector 31 is extendable out of the upper housing 21 into the receiving slot 215 through the first through hole 221 to be engageable with the port 101 of the electronic device 1 when the electronic device 1 is received in the docking station 2.

Figure 2:
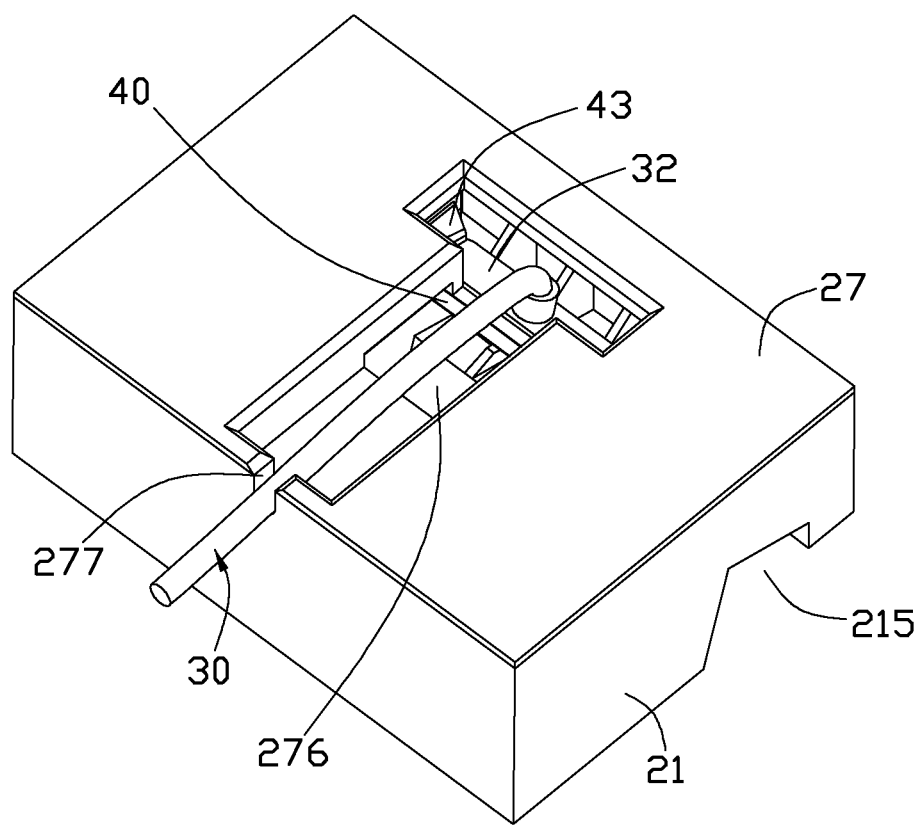
FIG. 2 is a perspective view of the docking station of FIG. 1.

Referring to FIGS. 2 and 3, the docking station 2 further includes a locking mechanism 40 for locking the docking port 30 in the receiving slot 215. The locking mechanism 40 includes two guiding members 41, two locking members 43, two elastic members 45, an operating member 47, and two restricting members 49. The two guiding members 41 respectively guide the movement of the locking members 43 such that each locking member 43 can interchange between a locked position in which the docking port 30 is locked to the housing 20 and an unlocked position in which the docking port 30 can be detached from the housing 20. The elastic members 45 are respectively disposed between the corresponding locking member 43 and the upper housing 21 to drive the corresponding locking members 43 back to its locked position from the unlocked position. The operating member 47 is connected to the locking members 43 for driving the locking members 43 to move to the unlocked position from the locked position when being operated. The restricting members 49 are used for restricting the movement direction of the operating member 47.

Each guiding member 41 defines a guiding slot 410 for slidably receiving the corresponding locking member 43. Each guiding member 41 further includes a cover 411 detachably covering on the guiding slot 410. The two guiding slots 410 of the two guiding members 41 are respectively located at two opposite sides of the first opening 219 and face each other. Each guiding slot 410 is surrounded by two opposite restricting walls 412 protruding from the internal surface of the bottom wall 218 and a connection wall 414 connecting the two restricting walls 412. One end of each restricting wall 412 which is away from the internal surface of the bottom wall 218 is recessed to define a first notch 415. The connection wall 414 connects two ends of the two restricting walls 412 which are adjacent to the first opening 219. The distances between each first notch 415 and the corresponding connection wall 414 are different from each other.

Each cover 411 includes a main part 416 and two opposite engaging portions 417 protruding from opposite rims of the main part 416 and respectively corresponding to the restricting walls 412. One end of each engaging portion 417 opposite to the main part 416 is recessed to define a second notch 418 and can be aligned with the corresponding first notch 415 when the covers 411 are respectively secured to the guiding slots 410.

The locking members 43 are respectively received in the guiding slots 410. Each locking member 43 includes a block 430 and a connection rod 431 protruding from the block 430. Each block 430 includes a restricting end 432 facing the other block 430 and defines an inclined surface 433. Each block 430 further defines a connection hole 434. Each connection hole 434 is inclined relative to the movement direction of the locking member 43 and extends from an end of the locking member 43 adjacent to the docking port 30 to an end of the locking member 43 away from the docking port 30 which is parallel to the corresponding middle portion 472, with an angle being equal to the angle between the middle portion 472 and the corresponding connection end 470. The connection rod 431 protrudes from one end of each block 430 opposite to the restricting end 432.

Two ends of each two elastic members 45 are respectively connected to the connection rod 431 and the internal surface of the side wall 213, 214.

The operating member 47 is substantially U shaped, and includes two connection ends 470 and a middle portion 472 formed between the two connection ends 470. The connection ends 470 are respectively able to be inserted into the connection holes 434 and are capable of sliding in the connection holes 434. The middle portion 472 is substantially perpendicular to the side wall 213/214 and forms an angle with each connection end 470. The middle portion 472 is capable of sliding relative to the upper housing 21 to drive the connection ends 470 to slide in the connection holes 434 respectively when pulled or pushed.

Each restricting member 49 is substantially a U shaped piece detachably connected to the corresponding holding portion 223 to define a channel 50 (see FIG. 4) for slidably receiving the middle portion 472 of the operating member 47.

Figure 4:
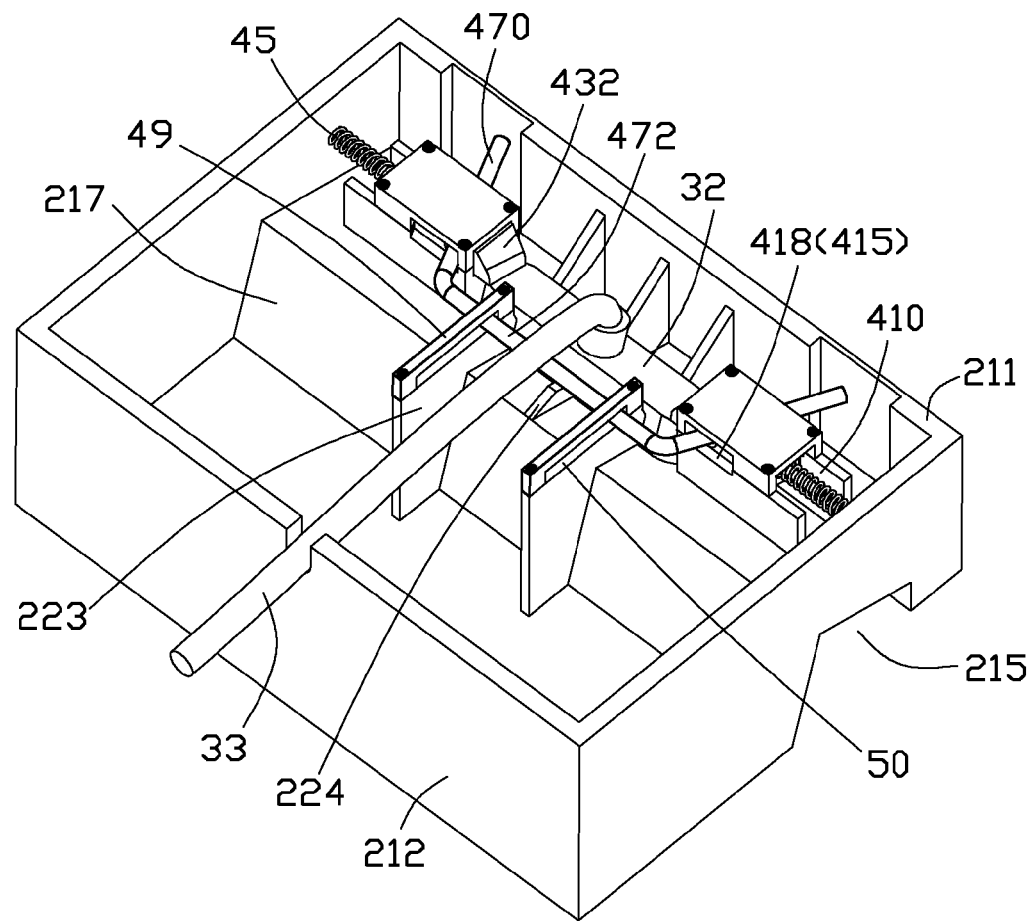
FIG. 4 is a partly schematic view of the docking station of FIG. 2 with the locking member in a locked position.
Figure 5:
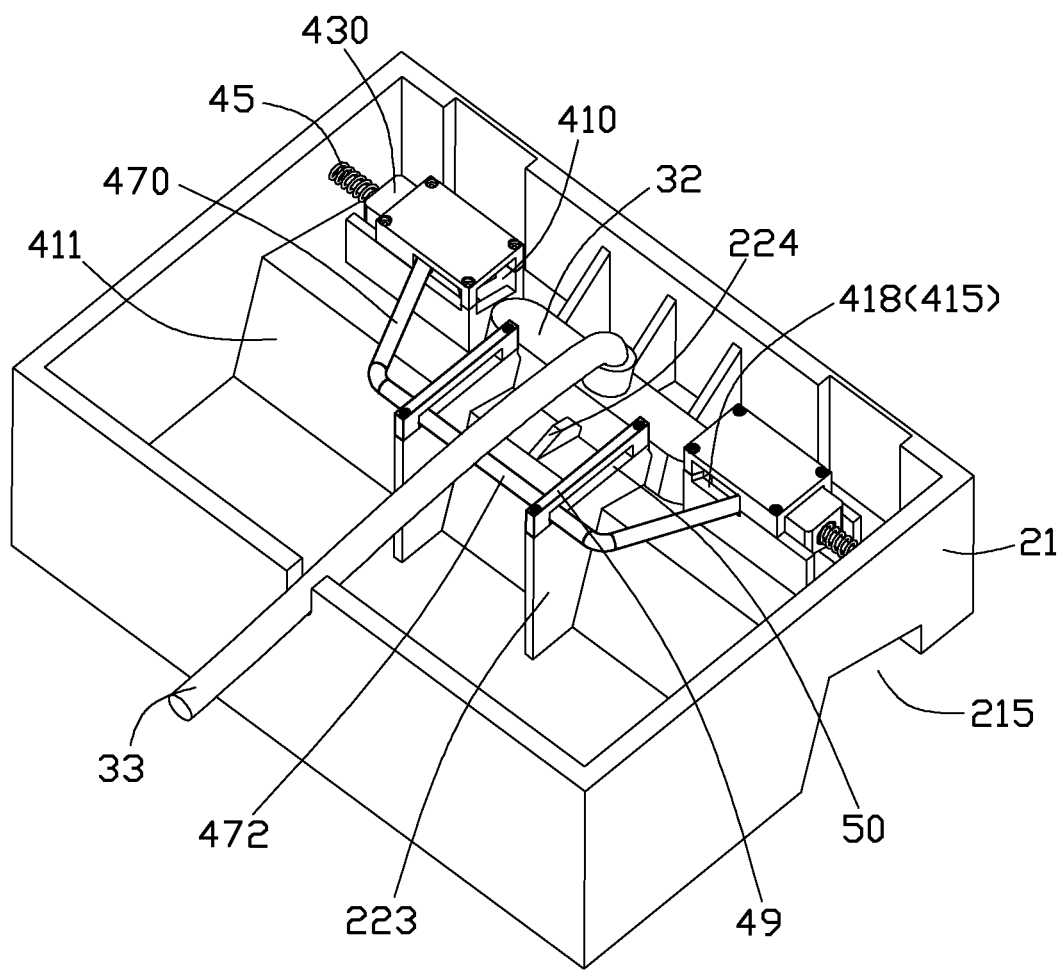
FIG. 5 is similar to FIG. 4 but with the locking member in a locked position.

Referring to FIGS. 1 and 4, in assembly, the docking port 30 is placed in the first opening 219, with the connector 31 extending into the receiving slot 215 through the first through hole 221 and the base 32 abutting the abutting wall 220. Each block 430 is received in the corresponding guiding slot 410 and abuts the free end of the corresponding connection wall 414, with the restricting end 432 facing the other block 430.

Each cover 411 is secured to the corresponding guiding slot 410, with the engaging portions 417 respectively abutting the restricting walls 412 of the corresponding guiding slot 410 for covering the corresponding block 430. At this time, each second notch 418 defined in each engaging portion 417 is aligned with the corresponding first notch 415 defined in each restricting wall 412 to define a hole. Opposite ends of each elastic member 45 are respectively secured to the connection rod 431 and the internal surface of the side wall 213/214. The operating member 47 is then connected to the locking members 45, with the middle portion 470 abutting the holding portions 223 and the connection ends 470 being respectively inserted into the connection holes 434 through the hole defined by the aligned first and second notches 415, 418. Each connection end 470 is long enough to extend out of the corresponding block 430 to abut the internal surface of the side wall 211. The restricting members 49 are then respectively secured to the holding portions 223 to define the channels 50 for slidably receiving the middle portion 472.

The lower housing 27 is then attached to the upper housing 21, with the second through hole 270 corresponding to the base 32, the third opening 277 corresponding to the second opening 222 and received in the second opening 222. In this state, the cable 33 of the docking port 30 is received in the holding slot 273 and extends out of the housing 20 through the third opening 277. The middle portion 472 is exposed to users through the third through hole 276 to allow operation as shown in FIG. 2.

When the docking port 30 is to be locked in the receiving slot 215, users can pull the middle portion 472 of the operating member 47 upwards for a certain distance through the third through hole 276. After disengaging with the abutting portion 224, the middle portion 472 is allowed to be driven to slide in the channels 50. As the middle portion 472 slides in the channels 50. The connection ends 470 slide in the connections holes 434 and drive the locking members 43 to move away from the first opening 219 against spring pressure of the elastic members 45 to the unlocked position in which the docking port 30 is allowed to be placed to or removed from the first opening 219. Thus, the docking port 30 is allowed to be placed in the first opening 219 with the connector 31 extending into the receiving slot 215 through the first through hole 221.

When the operating member 47 is released, the elastic members 45 rebound to drive the locking members 43 to slide in the guiding slots 410 to get close to the first opening 219. The locking members 43 thus are driven to the locked position in which the restricting end 432 extending out of the corresponding guiding slot 410 to partly abut the base 32. At this time, the docking port 30 is locked in the first opening 219 and the connector 31 cannot be retracted from the receiving slot 215. As each locking member 43 slides to the locked position, the middle portion 472 is driven to slide in the channels 50 to re-engage the abutting portion 224 to stably lock the connector 31 in the receiving slot 215.

Similarly, when the connector 31 needs to be retracted from the receiving slot 215, the operating member 47 can be operated again to drive each locking member 43 to move to the unlocked position from the locked position.

Even though information and the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A docking station for receiving an electronic device, comprising:
   a housing defining a receiving slot;
   a docking port arranged inside the housing and being capable of partly extending into the receiving slot to engage with the electronic device when the electronic device is received in the receiving slot;
   a locking mechanism connected to the docking port for locking the docking port in the receiving slot, the locking mechanism being partly exposed outside the housing to allow to be operated to drive the docking port to be retracted from the receiving slot, the locking mechanism comprises two locking members located at two opposite sides of the docking port; and
   an operating member connected to the two locking members and capable of being slid in a first direction relative to the housing;
   wherein each locking member defines a connection hole inclined relative to the first direction, for engaging with the operating member to drive the two locking members to move between an unlocked position and a locked position in a second direction perpendicular to the first direction.

2. The docking station as claimed in claim 1, wherein the housing defines a first through hole to allow the operating member to be partly exposed outside the housing.

3. The docking station as claimed in claim 1, wherein the operating member comprises two connection ends insertable into the two connection holes of the two locking members and a middle portion formed between the two connection ends, the middle portion is slidable relative to the housing to drive the connection ends to respectively slide in the connection holes to drive each locking member to the unlocked position from the locked position.

4. The docking station as claimed in claim 3, wherein each connection end forms an obtuse angle with the middle portion.

5. The docking station as claimed in claim 1, wherein the locking mechanism further comprises two guiding members respectively connected to the locking members for guiding the moving of the locking members.

6. The docking station as claimed in claim 1, wherein the locking mechanism further comprises two elastic members respectively configured between the corresponding locking member and the housing for rebounding to drive each locking member back to the locked position from the unlocked position.

7. The docking station as claimed in claim 3, wherein the locking mechanism further comprises two restricting members respectively connected to the housing for defining two channels for slidably receiving the operating member and further for restricting the moving direction of the operating member.

8. The docking station as claimed in claim 2, wherein the housing further defines a second through hole adjacent to the first through hole and corresponding to the docking port to allow the docking station to be retracted from the receiving slot.

9. A docking station for receiving an electronic device, comprising:
   a housing defining a receiving slot;
   a docking port disposed in the housing and capable of extending into the receiving slot to engage with the electronic device when the electronic device is received in the receiving slot;
   at least one locking member connected to the docking port and slidable relative to the housing to interchange between a locked position and an unlocked position, the at least one locking member engaging with the docking port to lock the docking port in the receiving slot when in the locked position and disengaging with the docking port to allow the docking port to be retracted from the receiving slot when in the unlocked position; and
   an operating member connected to the at least one locking members, the operating members comprise two connection ends being inserted into the at least one locking members and a middle portion formed between the two connection ends;
   wherein the middle portion is slidable relative to the housing to drive each connection end to slide in the corresponding locking member to drive the corresponding locking member to move to the unlocked position from the locked position.

10. The docking station as claimed in claim 9, wherein the docking station further defines at least one guiding slot slidably receiving the at least one locking member for guiding the moving of the at least one locking member, the at least one locking member is capable of extending out of the at least one guiding slot to abut the docking port in the locked position.

11. The docking station as claimed in claim 9, wherein the docking station further comprises at least one restricting member engaging with the housing to define a channel for slidably receiving the middle portion.

12. The docking station as claimed in claim 9, wherein the docking station further comprises at least one elastic member disposed between the at least one locking member and the housing to provide an elastic force to drive the at least one locking member back to the unlocked position from the locked position.

13. The docking station as claimed in claim 9, wherein a first through hole is defined in the housing to at least partly expose the middle portion.

14. The docking station as claimed in claim 13, wherein a second through hole corresponding to the docking port is also defined in the housing to allow the docking station to extend thereinto such that the docking port can be retracted from the receiving slot.

15. The docking station as claimed in claim 9, wherein an abutting portion protrudes from internal surface of the housing for abutting the middle portion to restrict the operating member from sliding relative to the housing.

16. The docking station as claimed in claim 1, wherein each connection hole is inclined from an end of the locking member adjacent to the docking port to an end of the locking member away from the docking port and parallel to the corresponding middle portion.

17. The docking station as claimed in claim 9, wherein each locking member defines a connection hole, and two connection ends is inserted into and slides in the two connection holes of the two locking members to drive each locking member to the unlocked position from the locked position.

18. The docking station as claimed in claim 17, wherein each connection hole is inclined from an end of the locking member adjacent to the docking port to an end of the locking member away from the docking port and is parallel to the corresponding middle portion.

19. A docking station for receiving an electronic device, comprising:

a housing defining a receiving slot;

a docking port disposed in the housing and capable of extending into the receiving slot to engage with the electronic device when the electronic device is received in the receiving slot; and at least one locking member connected to the docking port and slidable relative to the housing;

wherein the docking port comprises an operating member, and the operating member comprises two connection ends and a middle portion formed between the two connection ends; each connection end forms an obtuse angle with the middle portion, and the middle portion is slidable relative to the housing to drive each connection end to slide in the corresponding locking member.

20. The docking station as claimed in claim 9, wherein a first through hole is defined in the housing to at least partly expose the middle portion, and a second through hole corresponding to the docking port is also defined in the housing to allow the docking station to extend thereinto such that the docking port can be retracted from the receiving slot; an abutting portion protrudes from an internal surface of the housing for abutting the middle portion to restrict the operating member from sliding relative to the housing.

* * * * *